E. A. WALL.
WAVE MOTOR.
APPLICATION FILED APR. 10, 1911.

1,008,682.

Patented Nov. 14, 1911.

WITNESSES

INVENTOR
Enos A. Wall
by Geo. K. Evans
Attorney

UNITED STATES PATENT OFFICE.

ENOS A. WALL, OF SALT LAKE CITY, UTAH.

WAVE-MOTOR.

1,008,682. Specification of Letters Patent. Patented Nov. 14, 1911.

Application filed April 10, 1911. Serial No. 620,248.

*To all whom it may concern:*

Be it known that I, ENOS A. WALL, a citizen of the United States, residing at Salt Lake City, in the county of Salt Lake and State of Utah, have invented certain new and useful Improvements in Wave-Motors, of which the following is a specification.

My invention relates to wave motors.

The object of the invention is to provide a wave motor of the piston actuating type in which a plurality of pistons are actuated from a wave-operated reciprocating head in the form of a connected series of buckets, the piston and said head, together with the cylinders and valve mechanism being mounted upon a float mounted to rise and fall with the tide.

A further object of the invention is to provide for the pumping of air or water and to provide means whereby any of the pistons may be thrown out of action.

These objects I accomplish by the construction shown in the accompanying drawing, in which—

Figure 1:
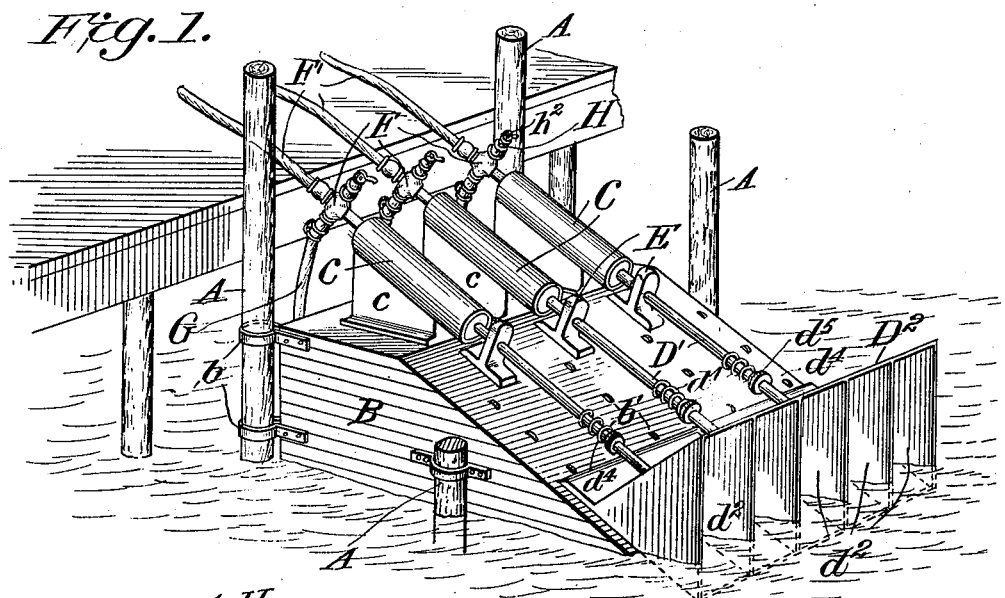
Figure 2:
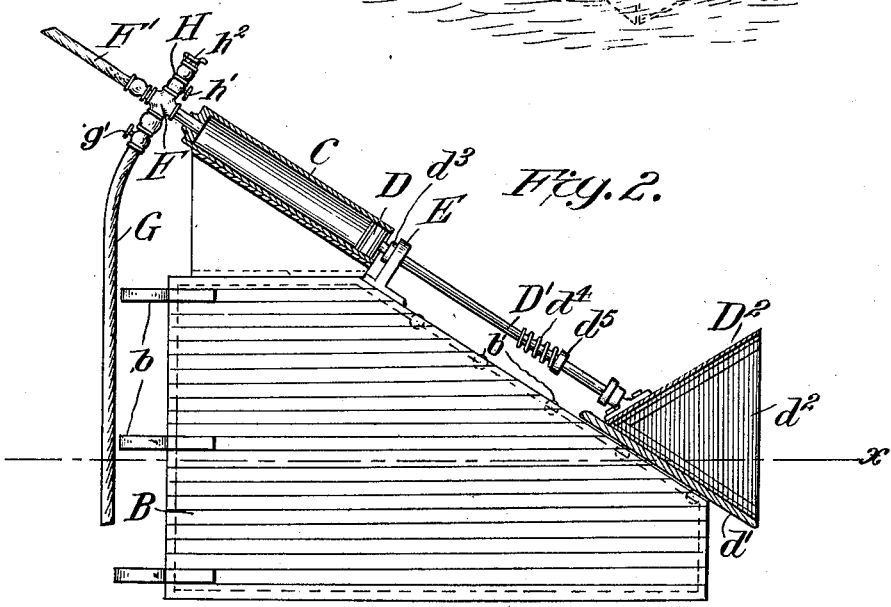
Figure 3:
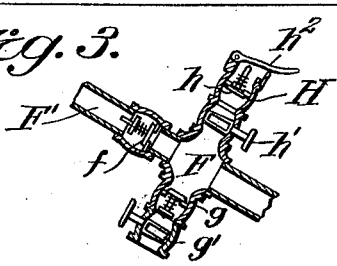

Figure 1 is a perspective of a wave motor containing my improvements. Fig. 2 is a sectional side elevation thereof. Fig. 3 is a detail sectional view of one of the valve casings and valve mechanism.

A, designates four vertical guides firmly supported at a point best adapted for the purpose, and B, is a float having guide straps $b$, or the like embracing the guides A, so that the float may travel up and down with the rise and fall of the tide.

The float may be water ballasted in the usual manner if desired. The top of the float B, is inclined downwardly and outwardly except at its rear portion which is flat and the inclined portion is provided with a number of anti-friction rollers $b'$.

C, C, C, designate a series of cylinders of small bore, set and inclined parallel to the inclination of the top of float B, with their bases $c$, firmly secured to the rear horizontal portion of the top of the float. The lower forward ends of the cylinders C, are open for the insertion of the pistons D, and in advance thereof are the guides E, firmly secured to the inclined portion of the float top.

From the pistons D, extend the piston rods D', which pass through the guides E, and at their outer ends are connected to the wave actuated head $D^2$. The head $D^2$, has a flat inclined base $d'$, which travels up and down the inclined portion of the float and friction is relieved by the rollers $b'$. The head $D^2$, is formed as a series of integral outwardly opening triangular buckets $d^2$. These buckets receive the impact of the waves so that their full force is received and applied to the pistons D. The outward travel of the pistons and connected parts is limited by collars $d^3$, on the piston rods D, above the guides E, and the upward movement of the pistons is limited and cushioned by springs $d^4$, mounted on the piston rods above the outer collars $d^5$.

F, F, F, indicate valve casings at the upper ends of the cylinders to each of which is connected a flexible discharge pipe F', a water inlet pipe G, and an air inlet H. The valve casings F, have at their outer ends check valves $f$, opening upwardly for the discharge of air or water through pipes F' and closing downwardly to prevent back flow. An inwardly opening check valve $g$, is placed at the discharge end of every pipe G, said pipes also having cutoff valves $g'$. The air inlet H has an inwardly opening check valve $h$, for the ingress of air and a cut off valve $h'$, for closing the air inlet when water is being pumped through pipes G, or any of them. The check valves $h$, may be locked open when it is desired to let the pumping mechanism run idle, by means of levers $h^2$ one for every air valve $h$. The pipes G, lead down into the water and the pipes F', lead to any suitable point on the shore where they may be connected with a tank or reservoir for water or air according to whether water or air is to be supplied. Buildings may thus be supplied with salt water or with salt air when the apparatus is located at the sea-shore where it is primarily intended to be used.

Briefly stated the operation is as follows: The waves in striking the bucketed head $D^2$, cannot glide past the same as would be the case in striking a plain surfaced head, but will exert great force on the head and force it up together with the pistons D, until stopped by the springs $d^4$ striking the guides E. If the cylinders C contain water and the air valves $h'$, are closed, the water in being forced up by the pistons will hold the check valves $g$, closed and open the outlet check valves $f$. As soon as the pistons have completed their up-stroke and forced out the water as described, the expansion of springs $d^4$, will start the pistons outwardly and the weight of the head $D^2$ acting by gravity will slide down to the lower end of the incline on the top of the float. A vacuum will thus be created behind the pistons which will at once fill with water through pipes G and so on as long as the force of the waves is sufficient to raise the heads $D^2$ and the pistons. When the waves are not very powerful one or more of the air check valves $h$, may be locked open, so that these pistons will not have to force any water. Where air is to be pumped instead of water the cut off valves $g'$, will be closed and the cut off valves $h'$ opened and the check valves $h$, allowed to work, whereupon the operation of pumping air will be effected every time the head $D^2$, is forced up by the waves.

In practice heavy concrete and steel construction will be employed in making a suitable foundation for the guides on which the float works. It is also intended in practice to mount a number of the pumping units like that shown, in series along the beach and to utilize their combined energy. The water and air stored may be used for many purposes as will be readily appreciated, and the pipes F' may all lead to a common main.

What I claim is:—

1. A wave motor comprising, a reciprocating head formed of a connected series of buckets to receive the impact of the waves, and a series of pumps all having their piston rods secured to the rear side of said head.

2. A wave motor comprising, a float mounted to rise and fall with the tide and having an inclined upper side, a head mounted to reciprocate on said incline and formed of a series of buckets to receive the impact of the waves, guides at the upper end of the incline, piston rods extending from the head up through said guides, pistons on the upper ends of the rods, pump cylinders in which the pistons work and inlet and outlet valves for the cylinders.

3. A wave motor comprising, a vertically movable float having an inclined guideway on its upper side, a head working on said guide way and formed of a connected series of buckets to receive the impact of the waves, and a pumping mechanism actuated from said head.

4. A wave motor comprising, a float mounted to rise and fall with the tide, a series of inclined pump cylinders provided with pistons having rods extending down toward the outer side of the float, a head connecting all of said pistons and provided with a series of buckets to receive the impact of the waves, air and water intake check valves and an outlet check valve for every pump cylinder.

5. A wave motor comprising, a float mounted to rise and fall with the tide, a series of inclined pump cylinders provided with pistons having rods extending down toward the outer side of the float, a head connecting all of the pistons and provided with a series of buckets or pockets to receive the impact of the waves, air and water intake check valves and an outlet check valve for every pump cylinder, means for locking the air check valves open and valves for shutting off the water and air intakes.

6. A wave motor comprising, a float mounted to rise and fall with the tide, a series of inclined pumps mounted on the float, a reciprocating head connecting the lower ends of all the pump rods and having a series of buckets to receive the impact of the waves, guides for the rods, collars on the rods above and below the guides, and springs on the rods above their lower collars.

In testimony whereof I affix my signature in presence of two witnesses.

ENOS A. WALL.

Witnesses:
HENRY A. RIPPE,
LLEWELLYN D. LEE.

---

Copies of this patent may be obtained for five cents each, by addressing the "Commissioner of Patents, Washington, D. C."